United States Patent
Sinha et al.

(10) Patent No.: US 10,929,593 B2
(45) Date of Patent: Feb. 23, 2021

(54) DATA SLICING OF APPLICATION FILE OBJECTS AND CHUNK-BASED USER INTERFACE NAVIGATION

(71) Applicant: Microsoft Technology Licensing, LLC, Redmond, WA (US)

(72) Inventors: Abhas Sinha, Telangana (IN); Tumu Sree Bharath, Telangana (IN); Sanjay Krupakar Bhat, Telangana (IN); Gopalakrishnan Venkateswaran, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 15/926,415

(22) Filed: Mar. 20, 2018

(65) Prior Publication Data

US 2019/0236116 A1 Aug. 1, 2019

(30) Foreign Application Priority Data

Jan. 31, 2018 (IN) .............................. 201841003736

(51) Int. Cl.
*G06F 17/00* (2019.01)
*G06F 40/106* (2020.01)
(Continued)

(52) U.S. Cl.
CPC ............ *G06F 40/106* (2020.01); *G06F 9/451* (2018.02); *G06F 40/177* (2020.01); *G06F 40/18* (2020.01)

(58) Field of Classification Search
CPC ............. G06F 17/546; G06F 17/30958; G06F 17/30994; G06F 40/106; G06F 40/18; G06F 40/177; G06F 9/451
See application file for complete search history.

(56) References Cited

U.S. PATENT DOCUMENTS 5,987,481 A 11/1999 Michelman et al.
7,441,207 B2 10/2008 Filner et al.
(Continued)

OTHER PUBLICATIONS

"Adding Rich Data Labels to Charts in Excel 2013", Retrieved from: <<https://blogs.office.com/en-us/2013/06/21/adding-rich-data-labels-to-charts-in-excel-2013/?eu=true>>, Jun. 21, 2013, 13 Pages.
(Continued)

*Primary Examiner* — Andrew T McIntosh

(57) ABSTRACT

In non-limiting examples of the present disclosure, systems, methods and devices for presenting a chunk-based user interface for an application file are provided. An application file may be accessed, wherein the application file comprises an object comprising a plurality of values arranged in a grid format. An indication to present the application file in a chunk-based user interface format may be received. A first chunk may be presented on the display of the computing device, wherein the first chunk comprises a first set of the plurality of values of the object. A second chunk may also be presented on the display of the computing device, wherein the second chunk comprises a second set of the plurality of values of the object. The chunks presented via the chunk-based user interface may be displayed in association with range elements indicating a range of cells and/or values represented by corresponding chunks.

18 Claims, 9 Drawing Sheets

(51) Int. Cl.
*G06F 9/451* (2018.01)
*G06F 40/18* (2020.01)
*G06F 40/177* (2020.01)

(56) References Cited

U.S. PATENT DOCUMENTS

| | | |
|---|---|---|
| 7,487,138 B2 | 2/2009 | Borthakur et al. |
| 9,778,834 B2 | 10/2017 | Evans et al. |
| 2003/0011631 A1* | 1/2003 | Halahmi ............ G06F 17/30905 715/744 |
| 2004/0017391 A1* | 1/2004 | Druyan ................. G06F 40/117 715/738 |
| 2006/0184901 A1* | 8/2006 | Dietz .................. G06F 3/04855 715/855 |
| 2008/0043256 A1* | 2/2008 | Broda ................... G06F 17/211 358/1.3 |
| 2009/0313574 A1* | 12/2009 | Shih ...................... G06F 3/0483 715/781 |
| 2011/0154259 A1* | 6/2011 | Kennedy ......... H04M 1/274583 715/811 |
| 2011/0314407 A1* | 12/2011 | Cruz Moreno ... G06F 17/30899 715/777 |
| 2012/0036466 A1* | 2/2012 | Venon ................. G06F 3/04886 715/772 |
| 2013/0111319 A1 | 5/2013 | Lin et al. |
| 2013/0339830 A1 | 12/2013 | Yuan et al. |
| 2014/0281868 A1* | 9/2014 | Vogel .................. G06F 3/04883 715/212 |
| 2015/0020007 A1* | 1/2015 | Lederer ................. G06F 3/0484 715/764 |
| 2015/0169531 A1* | 6/2015 | Campbell ............. G06F 17/246 715/212 |
| 2017/0124055 A1 | 5/2017 | Radakovitz et al. |

OTHER PUBLICATIONS

Acampora, Jon, "How to Make Your Excel Dashboards Resize for Different Screen Sizes", Retrieved from: <<https://www.excelcampus.com/vba/resize-dashboards-for-screen-sizes/>>, Jul. 20, 2015, 13 Pages.
"Customizing Viewports", Retrieved From: http://helpcentral.componentone.com/NetHelp/SpreadNet7/WF/spwin-sheetviewports.html, 4 Pages.
"International Search Report and Written Opinion Issued in PCT Application No. PCT/US19/012013", dated Mar. 26, 2019, 10 Pages.

* cited by examiner

US 10,929,593 B2

DATA SLICING OF APPLICATION FILE OBJECTS AND CHUNK-BASED USER INTERFACE NAVIGATION

RELATED APPLICATIONS

This application is related to and claims priority to Indian Provisional Patent Application No. 201841003736 filed on Jan. 31, 2018 and is entitled "DATA SLICING OF APPLICATION FILE OBJECTS AND CHUNK-BASED USER INTERFACE NAVIGATION," which is hereby incorporated by reference in its entirety.

BACKGROUND

Users of software applications that include grid-based objects, such as tables and charts in spreadsheet applications, often utilize single sheets and/or files to input, access, and view large amounts of data. It is not uncommon for a single table in a sheet in such an application to include hundreds or thousands of values in one or more columns and/or rows therein. As such, viewing and navigating application files that include grid-based objects, is often difficult for users, even on computing devices that have large displays. The poor user experience is made worse when such files are accessed via computing devices that have limited display space (e.g., tablets, smart phones), and limited input mechanisms and devices for navigating application files, which have become ubiquitous for accessing work and personal data of all types.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for presenting a chunk-based, or card view, user interface for software application files that include values arranged in a grid format. One or more computing devices associated with an application file may analyze the application file for a plurality of values arranged in a grid format. For example, a determination may be made as to whether the application file includes one or more of a pivot chart, a basic chart, a pivot table, a basic table, a range, and/or an image. Upon accessing an application file that includes an object comprising a plurality of values arranged in a grid format, and receiving an indication to present the application file in a chunk-based user interface, an accessing computing device may cause each of a plurality of chunks comprising a portion of the object to be displayed in the chunk based user interface. Additionally, according to some examples, upon identifying a chart and/or an image in the application file, and receiving an indication to present the application file in a chunk-based user interface, an accessing computing device may cause one or more chunks corresponding to each identified chart and/or image in the application file to be displayed in the chunk-based user interface.

BRIEF DESCRIPTION OF THE DRAWINGS

Non-limiting and non-exhaustive examples are described with reference to the following figures.

DETAILED DESCRIPTION

Figure 1:
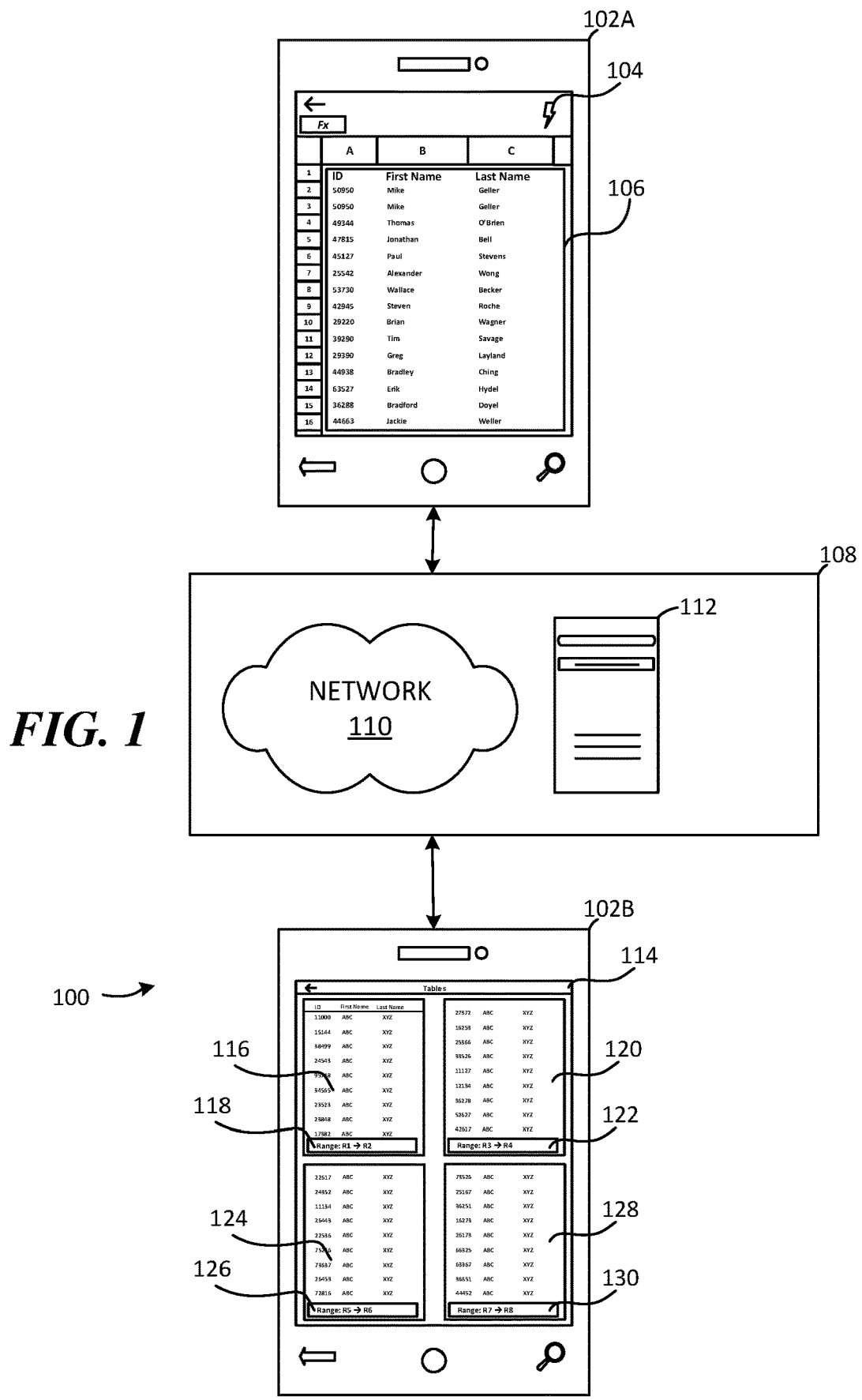
FIG. 1 is a schematic diagram illustrating an example distributed computing environment for presenting a chunk-based user interface for a spreadsheet application file comprising a plurality of values arranged in a grid format.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for presenting a chunk-based, or card view, user interface for software application files that include values arranged in a grid format. In some examples, a chunk-based user interface comprising chunks of all or a portion of tables, charts, graphs, and/or images, for a corresponding application file may be provided according to the aspects described herein. For example, an application file (e.g., a spreadsheet application file, a word processing application file, a presentation application file, an email application file) may include one or more tables comprised of columns and rows. The tables may comprise distinct table objects in the application file, or the tables may comprise user-created relationships between the data included in columns and rows in the application file (e.g., a user may not have inserted a distinct table object into the application file, but a user may have input data into columns and rows in the application file in a grid-based format to represent relationships amongst the data).

In some examples, when an application file is opened, a computing device accessing that file may determine whether the file includes one or more tables, charts and/or graphs. If a determination is made that the file includes one or more tables, the accessing computing device may present the one or more tables in a user interface comprising one or more chunks. In some examples, the chunk-based user interface may be presented based on a determination that the display space of the accessing computing device is smaller than a threshold viewing space value. In other examples, the chunk-based user interface may be presented based on a determination that the accessing computing device is a mobile computing device (e.g., a smart phone, a tablet). In still other examples, if a determination is made that the file includes one or more tables, the accessing computing device may present a user-selectable option to the accessing user to view the one or more tables in a user interface comprising one or more chunks. In additional examples, if the file is opened in a standard view (e.g., not the chunk-based user interface format), a user may zoom out (e.g., provide a pinch action on the display of the user interface, provide a zoom out command via an input device to the computing device accessing the file), and the chunk-based user interface may be presented based on the zoom level reaching a minimum zoom percentage threshold (e.g., 25%, 30%, 35%).

In examples where the application file is determined to include one or more charts or graphs, the accessing computing device may present the one or more charts or graphs in a user interface comprising one or more chunks. In examples where the application file is determined to include one or more charts or graphs and one or more tables, the accessing computing device may present the one or more charts or graphs and the one or more tables in a user interface comprising a plurality of chunks, with each chart or graph comprising at least one chunk, and each table comprising at least one chunk. According to some aspects, a user may scroll through each chunk of the chunk-based user interface corresponding to each table or chart of an application file. For example, a first set of chunks corresponding to one or more tables of an application file may be presented on a first portion of the user interface, and a user may vertically or horizontally scroll through chunks/cards corresponding to each chunk of the one or more tables. Likewise, a second set of chunks corresponding to one or more charts and/or graphs of an application file may be presented on a second portion of the user interface, and a user may vertically or horizontally scroll through chunks/cards corresponding to each chunk of the one or more charts and/or graphs.

According to some aspects, when an accessing computing device accesses an application file (e.g., a spreadsheet application file, a word processing application file, a presentation application file, an email application file), the computing device may analyze the application file to determine whether it includes at least one table, chart and/or graph. If the application file is determined to comprise at least one table, the computing device may slice the at least one table into one or more chunks for display in a chunk-based user interface. Likewise, if the application file is determined to comprise at least one chart and/or graph, the computing device may slice the chart and/or graph into one or more chunks for display in a chunk-based user interface. In some examples, a chart or graph in an application file may be presented in a single chunk (e.g., a preview card) in the chunk-based user interface. In other examples, each chart or graph in an application file may be presented in a plurality of chunks in the chunk-based user interface.

In examples where an application file is determined to comprise at least one table, and the at least one table is sliced into a plurality of chunks, each of the chunks may comprise a plurality of columns and a plurality of rows. That is, the computing device may slice each identified table into smaller pieces (i.e., chunks) comprised of columns and rows for viewing in a chunk-based user interface. In examples where a table is sliced into a plurality of chunks, each chunk may be displayed in the chunk-based user interface as a preview element of a portion of the table that it represents.

In examples, if an identified table comprises X number of rows, and Y number of columns, a first chunk may be presented in the chunk-based user interface comprising a subset of the X number of the rows, and a subset of the Y number of columns. For example, if an identified table comprises twenty rows and five columns, a first chunk corresponding to the table may be presented in the chunk-based user interface comprising the first ten rows of the table (e.g., cells A1:E10 of a spreadsheet), and a second chunk corresponding to the table may be presented comprising the second ten rows of the table (e.g., cells A11:E20 of a spreadsheet). Columns of a table may similarly be sliced for display in a chunk-based user interface. For example, if an identified table comprises twenty rows and ten columns, a first chunk corresponding to the table may be presented in the chunk based user interface comprising the first ten rows and the corresponding first five columns of the table (e.g., cells A1:E10 of a spreadsheet), a second chunk corresponding to the table may be presented comprising the first ten rows and the corresponding second five columns of the table (e.g., cells F1:J10 of a spreadsheet), a third chunk corresponding to the table may be presented comprising the second ten rows and the corresponding first five columns of the table (e.g., cells A11:E20 of a spreadsheet), and a fourth chunk corresponding to the table may be presented comprising the second ten rows and the corresponding second five columns of the table (e.g., cells F11:J20 of a spreadsheet). The number of rows and columns in a chunk viewable in the chunk-based user interface may differ according to one or more of: the amount of information in each cell of a table, a setting in the application, a size of a table, a size of an accessing computing device's display space, and/or a user-selected application preference, for example.

In some examples, each chunk of a table presented in the chunk-based user interface may be user-selectable. For example, a user may interact with a chunk in the chunk-based user interface via a mouse click, a touch on the display of the user interface corresponding to a chunk, a typed command, and/or a verbal command. Upon receiving a user-selection of a chunk, the computing device accessing the corresponding application file may present a full version of a sheet and/or document corresponding to the table represented by the selected chunk. In some examples, a full version of the sheet and/or document may be presented to the user such that a portion of the table corresponding to the selected chunk is displayed on the computing device. In other examples, upon receiving a user-selection of a chunk, the computing device accessing the corresponding application file may present the table corresponding to the selected chunk, excluding the display of other content of the sheet and/or document. Thus, in some examples, if a sheet and/or document of an application file includes a plurality of tables, and a user selects a chunk corresponding to one of the plurality of tables via the chunk-based user interface, the entire sheet and/or document may be presented on the display of the computing device, while presenting the portion of the sheet and/or document on the user interface corresponding to the selected chunk. In other examples, if a sheet and/or document of an application file includes a plurality of tables, and a user selects a chunk corresponding to one of the plurality of tables via the chunk-based user interface, a full version of the table corresponding to the selected chunk may be presented on the display of the computing device, and none of the other tables included in the sheet and/or document may be presented, and/or be navigable to, in that implementation of the user interface. In additional examples, the specific portion (e.g., a cell, a value, a column, a row) of a selected chunk may be highlighted or otherwise indicated in the full version of a corresponding table when it is caused to be presented on the display of the computing device based on the user's selection of the specific portion of chunk.

In some examples, each chunk corresponding to a table in the chunk-based user interface may be displayed in association with a range element. In examples where a chunk corresponds to a table having defined rows and columns, a range element comprising the rows and columns that it represents in relation to its corresponding table may be caused to be displayed in association with its associated chunk in the chunk-based user interface. For example, if a first chunk represents cells A1:D10 of a table, and a second chunk represents cells A11:D20 of the table, the first chunk may be displayed in the chunk-based user interface with a corresponding range element indicating that the first chunk represents cells A1:D10 of the table, and the second chunk may be displayed in the chunk-based user interface with a corresponding range element indicating that the second chunk represents cells A11:D20 of the table.

In examples where a chunk presented in the chunk-based user interface represents a portion of a table that is sorted by a value type, a range element comprising the range of sorted values in the table represented by the chunk may be caused to be displayed in association with the chunk. Thus, in an example where a table is sorted in alphabetical order based on values in a column in the table, a chunk representing a portion of the table in the chunk-based user interface may be displayed in association with a range element comprising the first value in the sorted column of the table that the chunk represents, and the last value in the sorted column of the table that the chunk represents. In an example where a table is sorted by number (e.g., highest to lowest or lowest to highest), a chunk representing a portion of the table in the chunk-based user interface may be displayed in association with a range element comprising the first number value in the sorted column of the table that the chunk represents, and the last number value in the sorted column of the table that the chunk represents. Likewise, if a table is sorted by date (e.g., most recent to oldest or oldest to most recent), a chunk representing a portion of the table in the chunk-based user interface may be displayed in association with a range element comprising the first date value in the sorted column of the table that the chunk represents, and the last date value in the sorted column of the table that the chunk represents.

In examples where an application file comprises a plurality of tables, each chunk, or set of chunks, corresponding to a table in the application file may be visually distinguished from each other chunk, or set of chunks, corresponding to a different table in the application file. For example, if an application file comprises a first table and a second table, a chunk-based user interface comprising a first set of chunks corresponding to the first table may be visually distinguished from a second set of chunks corresponding to the second table in the chunk-based user interface. According to some examples, each chunk in the chunk-based user interface corresponding to a table in an application file may have a color associated with it that is different from each other chunk in the chunk-based user interface corresponding to a different table in the chunk based user interface. For example, if an application file comprises a first table, a second table, and a third table, a chunk-based user interface comprising a first set of chunks corresponding to the first table may be displayed with a border having a first color, a second set of chunks corresponding to the second table may be displayed with a border having a second color, and a third set of chunks corresponding to the third table may be displayed with a border having a third color. In additional examples, a header in each set of chunks corresponding to distinct tables in an application file may be highlighted in distinct colors. In another example, a range element associated with each set of chunks corresponding to distinct tables in an application file may be highlighted in distinct colors. In other examples, the entirety of each chunk corresponding to distinct tables in an application files may be highlighted in distinct colors (e.g., a colored filter). Other mechanisms for visually distinguishing chunks in the chunk-based user interface may be utilized according to the aspects described herein. For example, a first set of chunks corresponding to a first table of an application file may be displayed on a first row of the chunk-based user interface, and a second set of chunks corresponding to a second table of the application file may be displayed on a second row of the chunk-based user interface. In other examples, each set of chunks may be distinguished from each other set of chunks by a header corresponding to each title of each table of an application file that each set of chunks represents in the chunk-based user interface.

In examples where an application file comprises one or more tables and one or more charts or graphs, the chunks corresponding to tables may be visually distinguished from the chunks corresponding to the charts or graphs in the chunk-based user interface. For example, the chunk-based user interface may comprise a first display space having a "tables" heading under which each chunk corresponding to tables of the application file are displayed, and the chunk-based user interface may comprise a second display space having a "charts" or "graphs" heading under which each chunk corresponding to charts or graphs of the application file are displayed.

In examples where an application file comprises a plurality of object types (e.g., a pivot chart object type, a basic chart object type, a pivot table object type, a basic table object type, a range object type, an image object type) that may be presented in a chunk-based format, each object type in that application file may be presented on the display of the chunk-based user interface based on an importance value. For example, a pivot table or chart is a summary of raw data, so pivot charts and pivot tables may have a higher importance value associated with them compared with basic tables or ranges (i.e., the raw data of a pivot chart or pivot table). Thus, chunks corresponding to a pivot table or pivot chart may be displayed in a more prominent manner (e.g., towards the top of a display space, larger chunk icons) in the chunk-based user interface than the raw data that the pivot table or pivot chart depends on. In some examples, the importance rank order for display, from highest importance value to lowest importance value, may comprise: pivot chart, chart, pivot table, table, ranges, images.

FIG. 1 is a schematic diagram illustrating an example distributed computing environment 100 for presenting a chunk-based user interface for a spreadsheet application file comprising a plurality of values arranged in a grid format. Exemplary distributed computing environment 100 includes computing device 102A/102B, and network and processing environment 108.

In the illustrated example, computing device 102A and 102B are the same computing device accessing the same spreadsheet application file. Computing device 102A has opened the spreadsheet application file in a standard user interface format in which the entirety of a sheet of the spreadsheet application file is navigable. The currently viewable cells of the spreadsheet application file by computing device 102A comprise cells A1:C16. A user may scroll vertically in the user interface displayed by computing device 102A to view additional rows included in the spreadsheet application file, and a user may scroll horizontally in the user interface displayed by computing device 102A to view additional columns included in the spreadsheet application file. In some examples, the spreadsheet application file may be stored on computing device 102A/102B. In other examples, the spreadsheet application file may be cloud-based, and reside on one or more remote computing devices, such as server computing device 112, and computing device 102A/102B may access the cloud-based spreadsheet application file via network 110.

The user interface displaying the spreadsheet application file on computing device 102A also comprises user-selectable point of interest icon 104. Upon selection of point of interest icon 104, computing device 102A/102B and/or one or more computing devices that the spreadsheet application file is being accessed from (e.g., server computing device 112), may analyze the data in the spreadsheet application file and determine whether the spreadsheet application file includes one or more tables, charts, graphs, and/or images. In this example, a determination has been made that the spreadsheet application file comprises a table.

Upon making the determination that the spreadsheet application includes a table, the accessing computing device (e.g., computing device 102A/102B) and/or one or more remote computing devices on which the spreadsheet application file is stored and accessed from (e.g., server computing device 112), may slice the table into a plurality of chunks for display in a chunk-based user interface. In the illustrated example, the spreadsheet application file has been sliced into a plurality of chunks corresponding to first chunk 116, second chunk 120, third chunk 124, and fourth chunk 128. Each chunk is displayed in chunk-based user interface 114 on computing device 102B.

The identified table in the spreadsheet application file comprises three columns and at least thirty-seven rows. The computing device 102A/102B, and/or one or more remote computing devices from which the spreadsheet application is accessed, has sliced the identified table into a plurality of chunks, each of the chunks corresponding to a plurality of rows and columns of the table. The first four chunks corresponding to the table of the spreadsheet application file are displayed on the chunk-based user interface 114 of computing device 102B, although additional chunks corresponding to additional portions of the identified table may be navigated to and displayed in the chunk-based user interface 114. For example, additional chunks/cards may be navigated to and displayed by receiving a swipe gesture to view a next page of chunks/cards of the table. In some examples, additional chunks corresponding to the identified table may be presented based on receiving a horizontal swipe. In other examples, additional chunks corresponding to the identified table may be presented based on receiving a vertical swipe. In still other examples, user may utilize an input device to scroll vertically or horizontally to access additional chunks corresponding to the table.

According to some examples, each chunk displayed in the chunk-based user interface 114 of computing device 102B may be displayed in association with a corresponding range element. For example, first chunk 116 is displayed in association with corresponding range element 118, second chunk 120 is displayed in association with corresponding range element 122, third chunk 124 is displayed in association with corresponding range element 126, and fourth chunk 128 is displayed in association with corresponding range element 130. In some examples, each range element may provide an indication of a range of cells of the table that are included in each displayed chunk in the chunk-based user interface 114. In examples where a table is sorted based on a column value type, each range element may provide an indication of the sorted value range of the table corresponding to each associated chunk in the chunk-based user interface 114.

According to some aspects, a user may interact with a chunk displayed on the chunk-based user interface. For example, a user may select second chunk 120, and a full version of the spreadsheet application file corresponding to the portion of the table as it relates to the selected chunk may be displayed on the user interface of computing device 102A/102B. In some examples, a portion of a table corresponding to a selected chunk may be caused to be highlighted in a displayed full version of the spreadsheet application file upon selection of the chunk. In other examples, if a user selects a distinct cell as depicted in a chunk of the chunk-based user interface 102B, the selected cell may be caused to be highlighted in a displayed full version of the spreadsheet application file upon selection of the cell in the chunk.

Thus, the systems, methods and devices described herein provide mechanisms for browsing application files that may comprise large sets of data as part of tables and/or charts in a user-friendly way, while also allowing users to access the full version of a table and/or chart at a desired location as selected in the chunk-based user interface. The chunk-based user interface described herein allows users to efficiently browse distinct chunks corresponding to tables and/or charts of an application file, and hone in on portions of interest in those tables and/or charts via interaction with displayed chunks, therefore eliminating the cost intensive and time consuming task of scrolling through large data sets, which can be difficult and unmanageable on computing devices with limited display sizes and/or limited input mechanisms for navigating those data sets.

Figure 2:
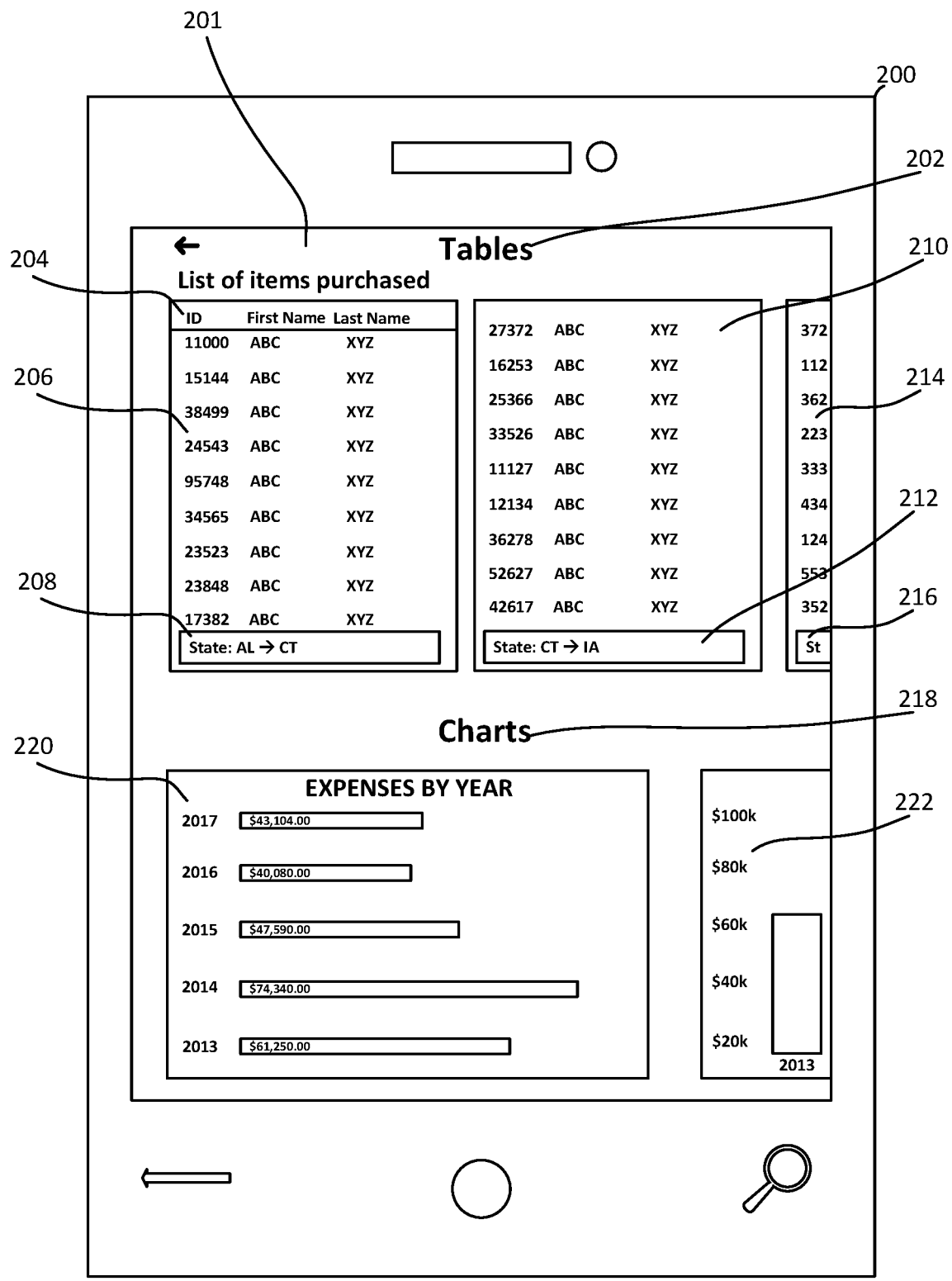
FIG. 2 illustrates an exemplary chunk-based user interface comprising a plurality of chunks corresponding to a table of an application file, and a plurality of chunks corresponding to a plurality of charts of the application file.

FIG. 2 illustrates an exemplary chunk-based user interface 201 displayed on computing device 200, the chunk-based user interface 201 comprising a plurality of chunks corresponding to a table of an application file, and a plurality of chunks corresponding to a plurality of charts of the application file. The chunk-based user interface 201 comprises first table chunk 206, second table chunk 210, and third table chunk 214, as well as first chart chunk 220, and second chart chunk 222. First table chunk 206, second table chunk 210, and third table chunk 210 each represent sliced portions of a table from an application file (e.g., a spreadsheet application file, a word processing application file). Each of the plurality of table chunks are spatially arranged horizontally in the chunk-based user interface 201 below displayed table element 202. Each of the chart icons are spatially arranged horizontally in the chunk-based user interface 201 below displayed chart element 218. A user may view additional table chunks corresponding to one or more tables of the application file by, for example, swiping horizontally on the presented table chunks depicted on the display of computing device 200. Likewise, a user may view additional chart chunks corresponding to one or more charts of the application file by, for example, swiping horizontally on the display of computing device 200. Other arrangements and navigation mechanisms may also be utilized. For example, the table chunks may be displayed vertically, and a user may view additional table chunks by swiping vertically on the display of computing device 200. Likewise, the chart chunks may be displayed vertically, and a user may view additional chart chunks by swiping vertically on the display of computing device 200.

First table chunk 206 comprises the first three columns of a header row of a table included in the application file, as well as the first three columns of nine rows following the header row of the table. Second table chunk 210 comprises the first three columns of nine rows following the nine rows displayed in first table chunk 206. If a user were to swipe to the left on the displayed table chunks, the entirety of third table chunk 214 would become visible on the chunk-based user interface 201, including the first three columns of nine rows following the nine rows displayed in second table chunk 210.

The table of the application file comprises additional columns from the first three columns shown in each of the displayed table chunks of the chunk-based user interface 201. In one of the not currently visible columns of the table, values are present corresponding to a state where each corresponding purchase included in the table was made. The table of the application file is sorted alphabetically by this "state" value column. As such, a range element in each of the displayed table chunks indicates a range of states (alphabetically) that are included in the rows corresponding to each chunk. For example, first table chunk 206 has a corresponding first range element 208 indicating that the rows depicted in first table chunk 206 correspond to purchase entries in the table based on their sort order in the table from Alabama to Connecticut. Second table chunk 210 has a corresponding second range element 212 indicating that the rows depicted in second table chunk 210 correspond to purchase entries in the table based on their sort order from Connecticut to Iowa. Third table chunk 214 has a corresponding second range element 216, which if viewable, would indicate that the rows depicted in third table chunk 214 correspond to purchase entries in the table based on their sort order from Iowa, to a state that is included in the last row of the table represented by third table chunk 214.

Figure 3:
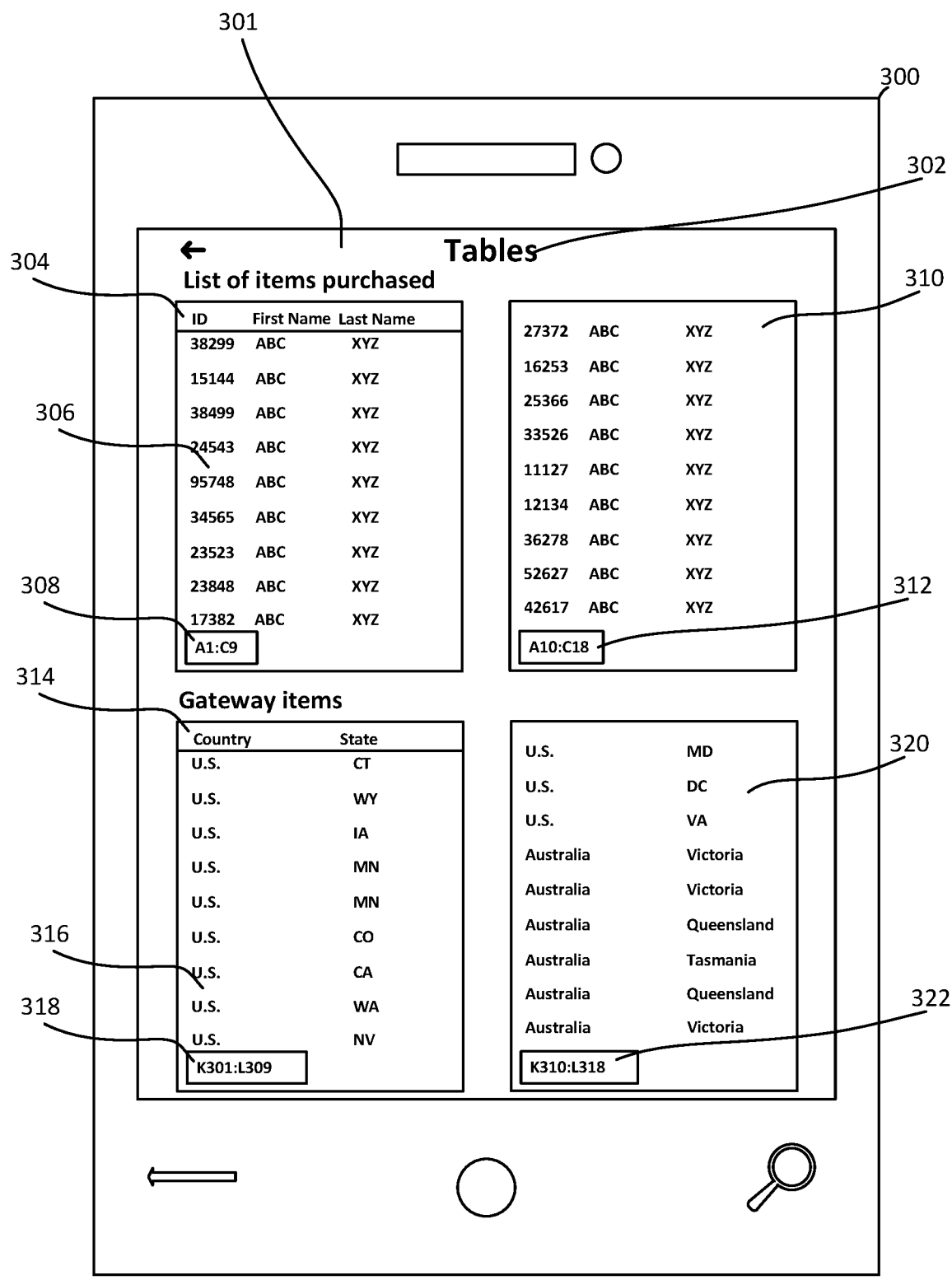
FIG. 3 illustrates an exemplary chunk-based user interface comprising a plurality of chunks corresponding to a plurality of tables of an application file.

FIG. 3 illustrates an exemplary chunk-based user interface 301, displayed on a computing device 300, the chunk-based user interface 301 comprising a plurality of chunks corresponding a plurality of tables of an application file. A first set of the plurality of chunks includes first chunk 306 and second chunk 310, which each correspond to a "list of items purchased" table in the application file. The second set of the plurality of chunks includes third chunk 316 and fourth chunk 320, which each correspond to a "gateway items" table in the application file.

First chunk 306 represents the header row of the "list of items purchased" table in the application file, as well as the first nine rows following the header row of the "list of items purchased" table in the application file. Second chunk 310 represents the nine rows that follow the first nine rows depicted in first chunk 306. The "list of items purchased" table in the application file is unsorted. Therefore, first chunk 306 is displayed in association with first range element 308. First range element 308 visually indicates a cell range in the table that first chunk 306 represents (i.e., cells A1:C9), and second chunk 310 is displayed in association with second range element 312, which visually indicates a cell range in the table that second chunk 310 represents (i.e., cells A10:C18).

Third chunk 316 represents the header row of two columns of the "gateway items" table in the application file, as well as the first nine rows of the two columns following the header row of the "gateway items" table in the application file. Fourth chunk 320 represents the nine rows of the two columns following the nine rows depicted in third chunk 316. The "gateway items" table in the application is unsorted. Therefore, third chunk 316 is displayed with third range element 318, which visually indicates a cell range in the table that third chunk 316 represents (i.e., K301:L309), and fourth chunk 320 is displayed in association with fourth range element 322, which visually indicates a cell range in the table that fourth chunk 320 represents (i.e., cells K310:C318).

In some examples, the range elements of each chunk corresponding to the "list of items purchased" table (e.g., first range element 308 and second range element 312) may be displayed or otherwise highlighted in a color that is different from a color in which the range elements of each chunk corresponding to the "gateway items" table (e.g., third range element 318 and fourth range element 322) are displayed or otherwise highlighted in within chunk-based user interface 301. In additional examples, chunks corresponding to different tables and/or charts may be differentiated from one another in the chunk-based user interface 301 by having different colored display borders. In still other examples, chunks corresponding to different tables and/or charts may be differentiated from one another in the chunk-based user interface 301 by having different colored filters applied to all or a portion of each chunk. In this manner users can easily differentiate chunks corresponding to different tables, making navigation of a plurality of tables of an application file more efficient, less cost prohibitive from a time and computer processing standpoint, and more manageable from a user experience standpoint.

Figure 4:
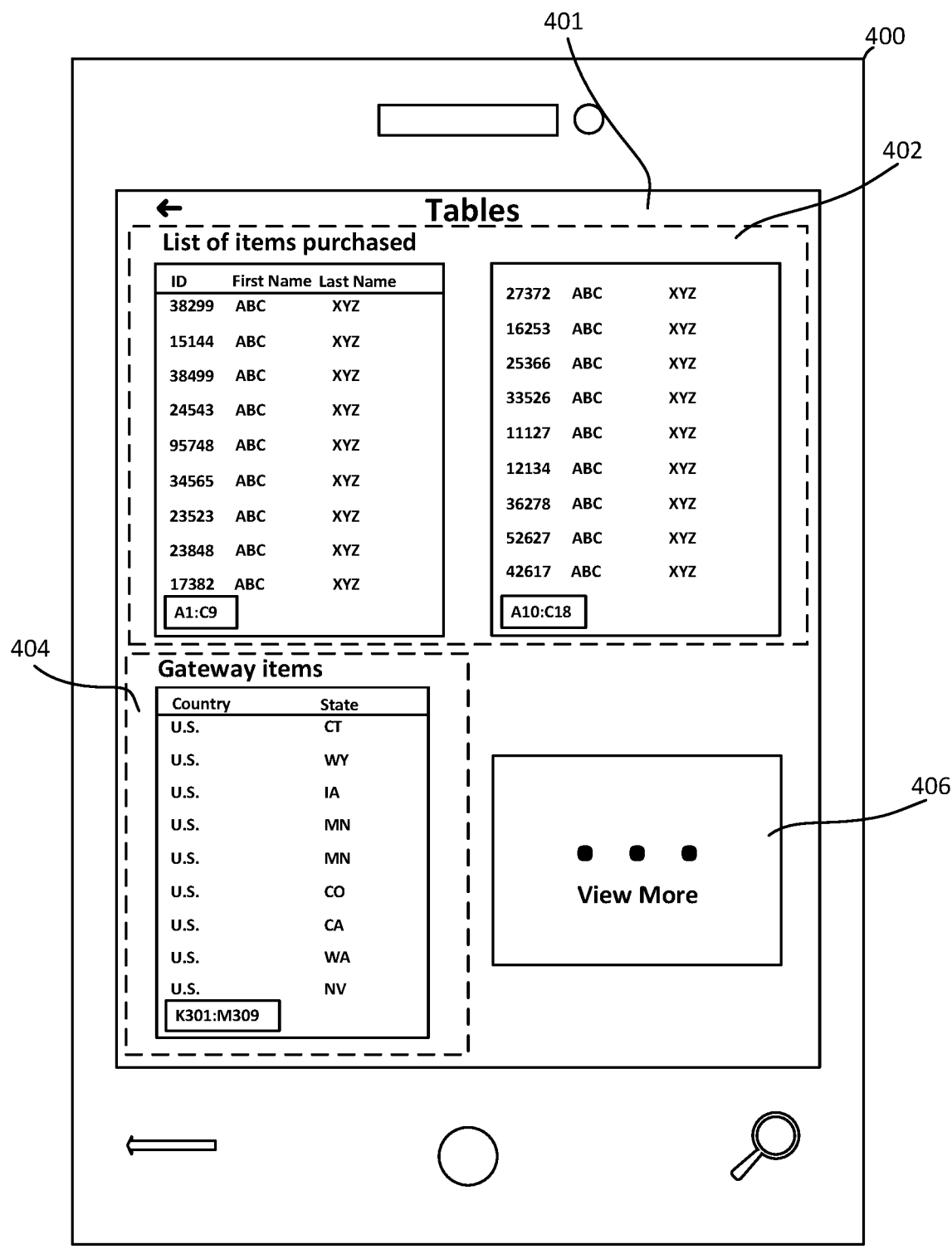
FIG. 4 illustrates an exemplary chunk-based user interface comprising a plurality of chunks corresponding to a plurality of tables of an application file, and a user-selectable element for causing one or more additional chunks corresponding to one or more tables of the application file to be displayed in the chunk-based user interface.

FIG. 4 illustrates an exemplary chunk-based user interface 401, displayed on computing device 400, the chunk-based user interface 401 comprising a plurality of chunks corresponding to a plurality of tables of an application file, and a user-selectable element 406 for causing one or more additional chunks corresponding to one or more tables of the application file to be displayed in chunk-based user interface 401.

Chunk-based user interface 401 comprises two chunks corresponding to a first "list of items purchased" table of the application file, the two chunks included in a first user interface element 402 of chunk-based user interface 401. Chunk-based user interface 401 also comprises a single chunk corresponding to a "gateway items" table of the application file, that chunk being included in a second user interface element 404 of chunk-based user interface 401. Although chunks corresponding to two tables of the application file are currently displayed in chunk-based user interface 401, the application file may comprise additional tables, which may be viewable, in whole or in part, as chunks in chunk-based user interface 401. For example, user-selectable element 406 may be selected by a user, and upon its selection, one or more additional chunks corresponding to one or more additional tables of the application file may be caused to be displayed by computing device 400 in chunk-based user interface 401.

Figure 5:
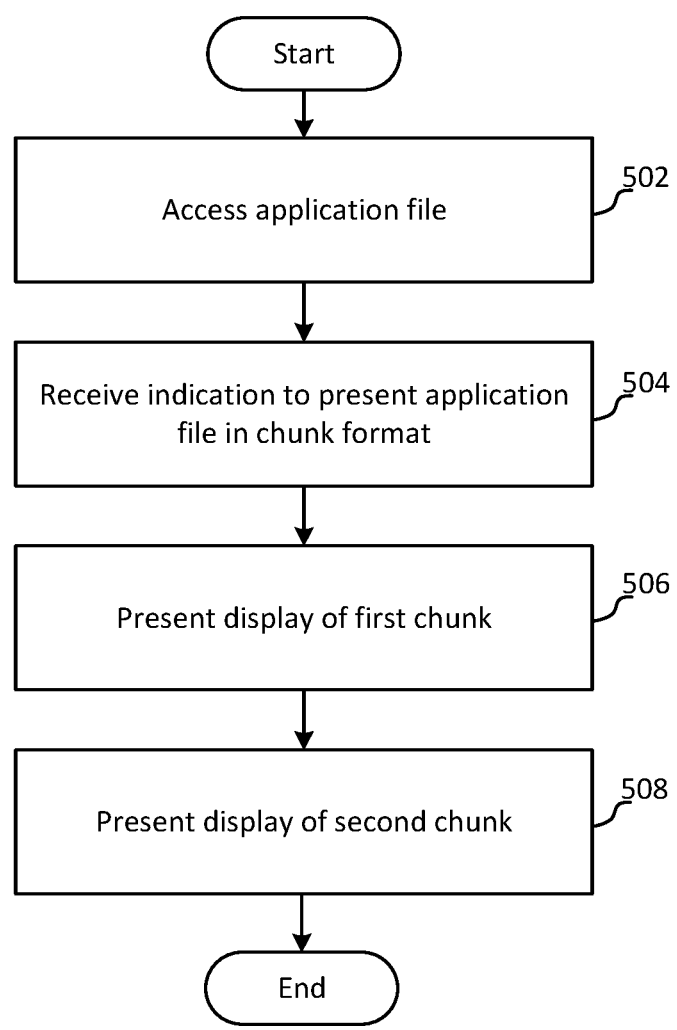
FIG. 5 is a second exemplary method for presenting a chunk-based user interface for a spreadsheet application file comprising a plurality of values arranged in a grid format.

FIG. 5 is an exemplary method 500 for presenting a chunk-based user interface for a spreadsheet application file comprising a plurality of values arranged in a grid format.

The method 500 begins at a start operation and flow continues to operation 502. At operation 502 a computing device accesses an application file comprising a plurality of values arranged in a grid-based format. The application file may comprise a spreadsheet application file, a word processing application file, a presentation application file, or any other application file that comprises a plurality of values arranged in a grid-based format. In some examples, the application file may be stored and accessed directly from a personal computing device (e.g., a smart phone, a tablet). In other examples, the application file may be cloud-based, and accessed by an accessing user's computing device via a network, such as network 110 depicted in FIG. 1.

From operation 502, flow continues to operation 504, where an indication to present the application file in a chunk-based user interface format is received. According to some examples, the indication may comprise a selection by an application user to view the application file in the chunk-based user interface format. In other examples, the indication may comprise a determination that the computing device a user is accessing the application file with is a mobile computing device. In still other examples, the indication may comprise a determination that the computing device a user is accessing the application file with has a display size of less than a threshold area. In additional examples, the indication may comprise a determination that the currently displayed application file has reached a threshold minimum zoom size (e.g., 25%, 30%, 35%).

From operation 504, flow continues to operation 506, where a first chunk corresponding to a table of the application file is displayed by a chunk-based user interface executed on the computing device a user is accessing the application file from. In some examples, a first plurality of cells/values included in a first plurality of rows/columns may be sliced from the table of the application file and displayed as a chunk in the chunk-based user interface. The first chunk may be displayed in the chunk-based user interface in association with a range element that indicates a range of cells and/or values of the table that are represented/presented by the first chunk. In some examples, each range element corresponding to a chunk that has a same table of the application file that it represents may have a unique display color associated with it.

From operation 504, flow continues to operation 508, where a second chunk corresponding to the table of the application file is displayed by the chunk-based user interface. In some examples, the second chunk may comprise a second plurality of cells/values included in a second plurality of rows/columns of the table of the application file, which follow the first plurality of cells/values included in the first plurality of rows/columns displayed in the first chunk. For example, if the first chunk comprises cells A1:B10 of a table of the application file, the second chunk may comprise cells A11:B20 of the table. Like the first chunk, the second chunk may be displayed in the chunk-based user interface in association with a range element that indicates a range of cells and/or values of the table that are represented/presented by the second chunk.

In some examples, a user may select the first or second chunk via the chunk-based user interface. In one example, if a user selects one of the first or second chunks, a full navigable version of the application file may be presented on the user interface displayed by the accessing computing device, with all or a portion the cells/values that are represented by the selected chunk displayed in the viewable area of the display. In another example, if the user selects one of the first or second chunks, a full navigable version of the table corresponding to the selected chunk may be presented on the user interface displayed by the accessing computing device, with all or a portion of the cells/values that are represented by the selected chunk displayed in the viewable area of the display. In examples where a specific cell or value is selected from one of the first or second chunks in the chunk-based user interface, a full navigable version of the table corresponding to the selected chunk may be presented on the user interface displayed by the accessing computing device, with the cell/value that was selected in the chunk-based user interface highlighted in the viewable area of the display.

From operation 508, flow continues to an end operation, and the method 500 ends.

Figure 6:
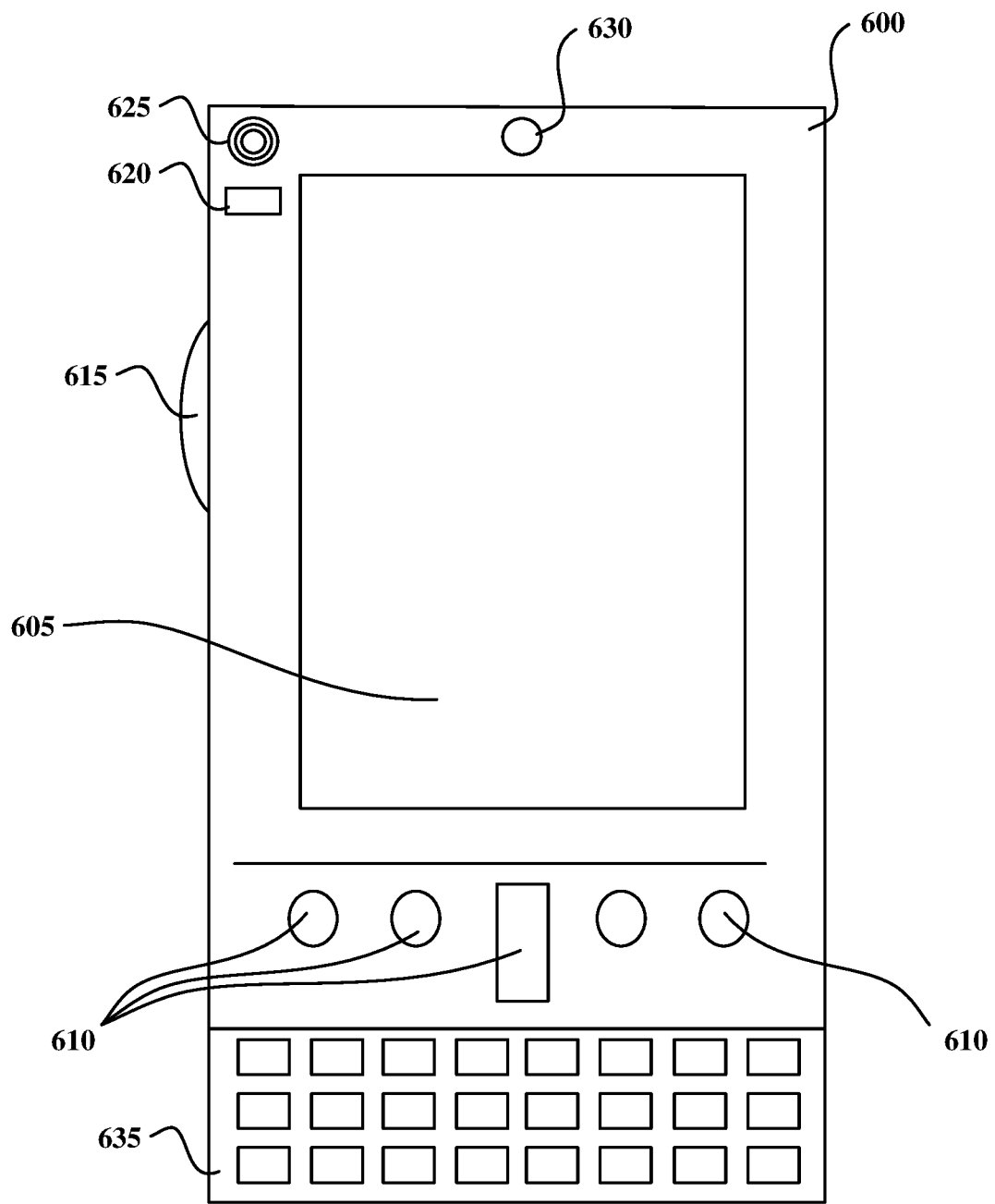
FIGS. 6 and 7 are simplified diagrams of a mobile computing device with which aspects of the disclosure may be practiced.
Figure 7:
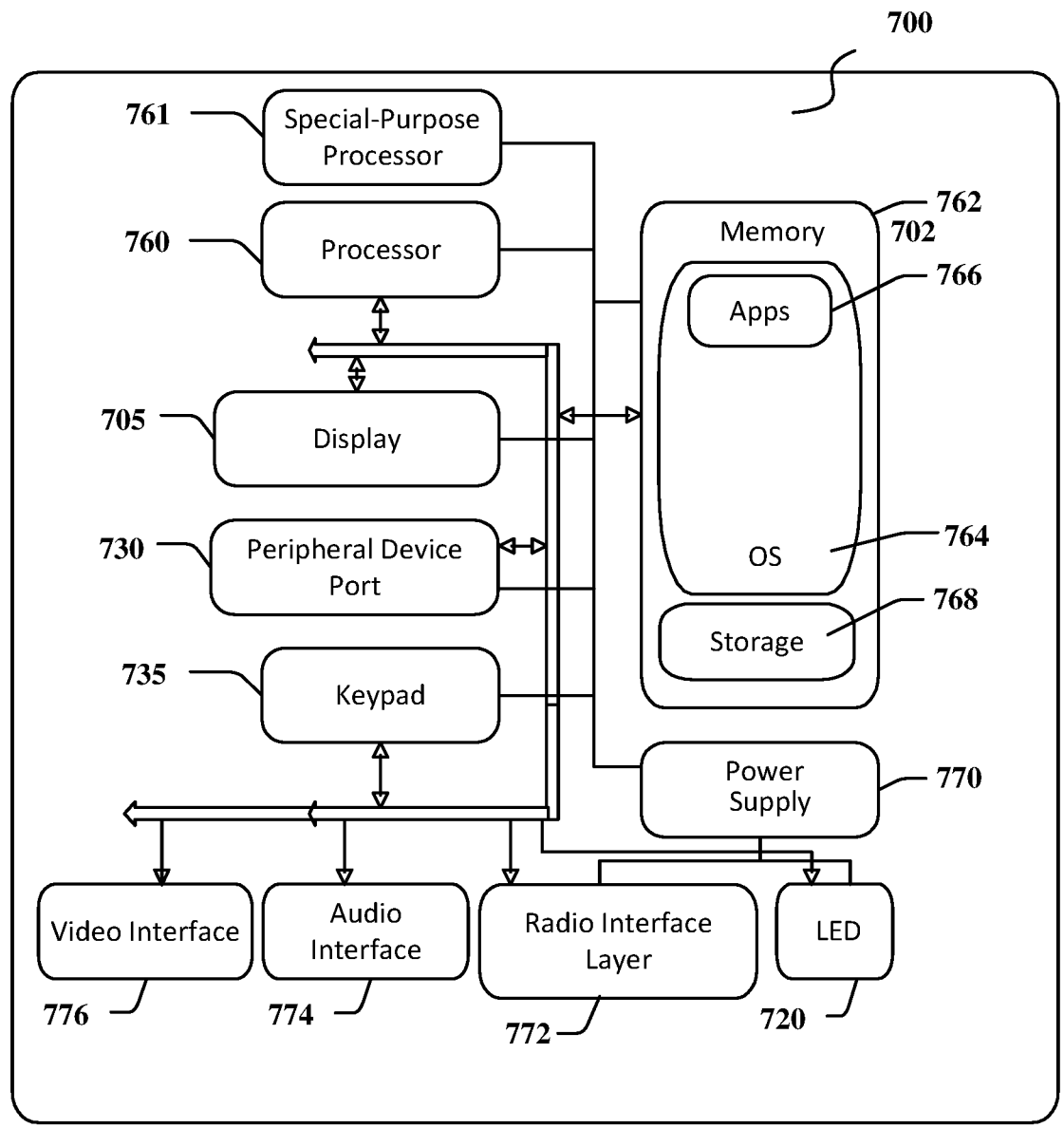

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
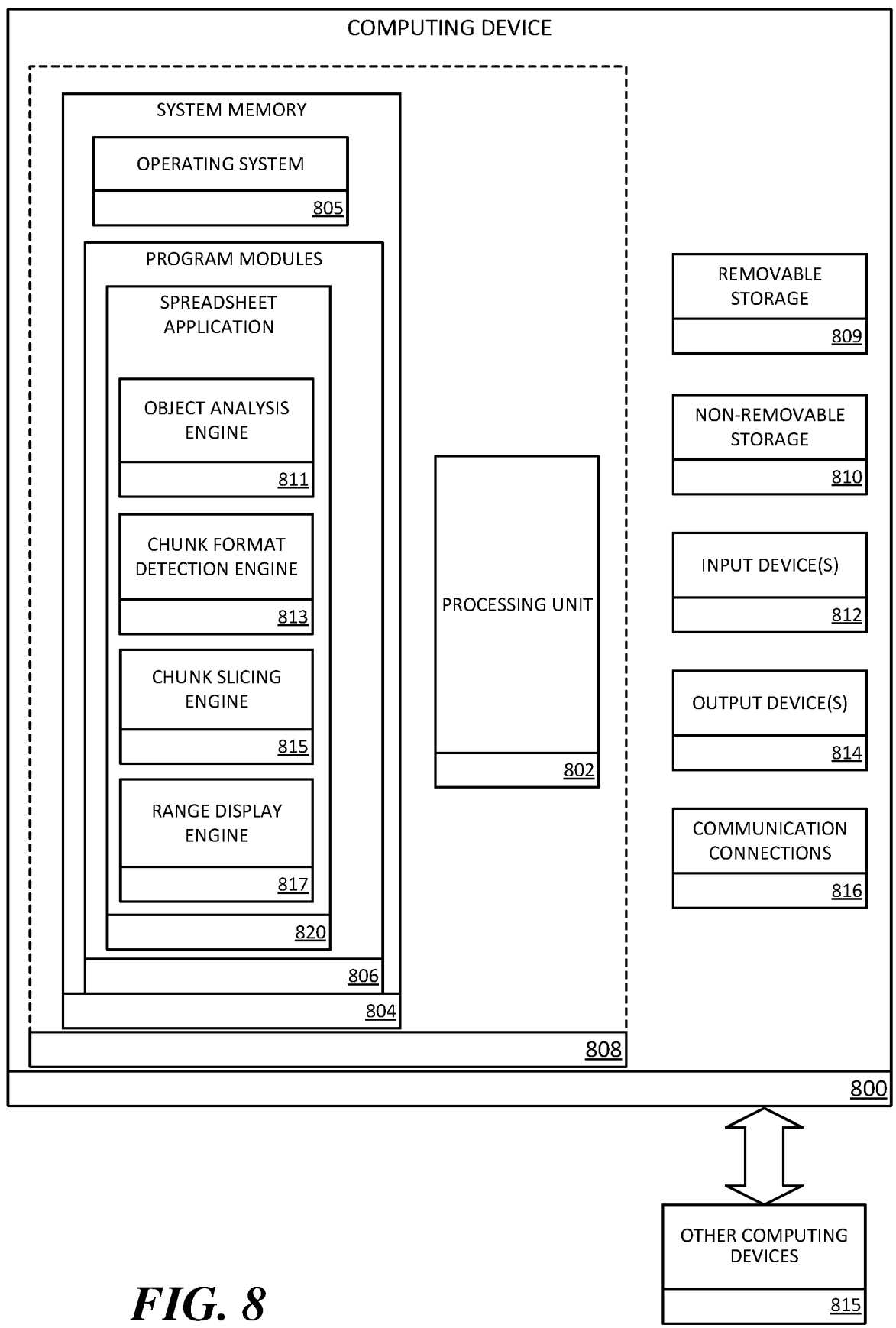
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with presenting a chunk-based user interface for an application file. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more applications that include a plurality of values arranged in a grid-based format. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., spreadsheet application 820) may perform processes including, but not limited to, the aspects, as described herein. According to examples, the object analysis engine 811 may analyze an application file and determine whether one or more objects included in the application file comprise a grid-type arrangement (e.g., a table, a chart). The chunk format detection engine 813 may perform one or more operations related to determining whether an indication is provided to display a plurality of values, tables, charts, and/or images, in a chunk-based user interface. In some examples, the chunk format detection engine 813 may determine whether an accessing computing device has a display that is below a threshold area value for displaying a chunk-based user interface of an application file. In other examples, the chunk format detection engine 813 may determine whether a zoom of a user interface displaying an application file meets a minimum zoom threshold value (e.g., 25%, 30%, 35%) for displaying a chunk-based user interface of an application file. In additional examples, the chunk format detection engine 813 may receive a user selection to display one or more elements of an application file in a chunk-based user interface format. The chunk slicing engine 815 may perform one or more operations associated with slicing one or more grid-based objects of an application into parts for display as individual chunks in a chunk-based user interface format. The range display engine 817 may perform one or more operations associated with determining the range of cells and/or values to be displayed in a chunk, and causing that range to be indicated in association with the display of the chunk.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
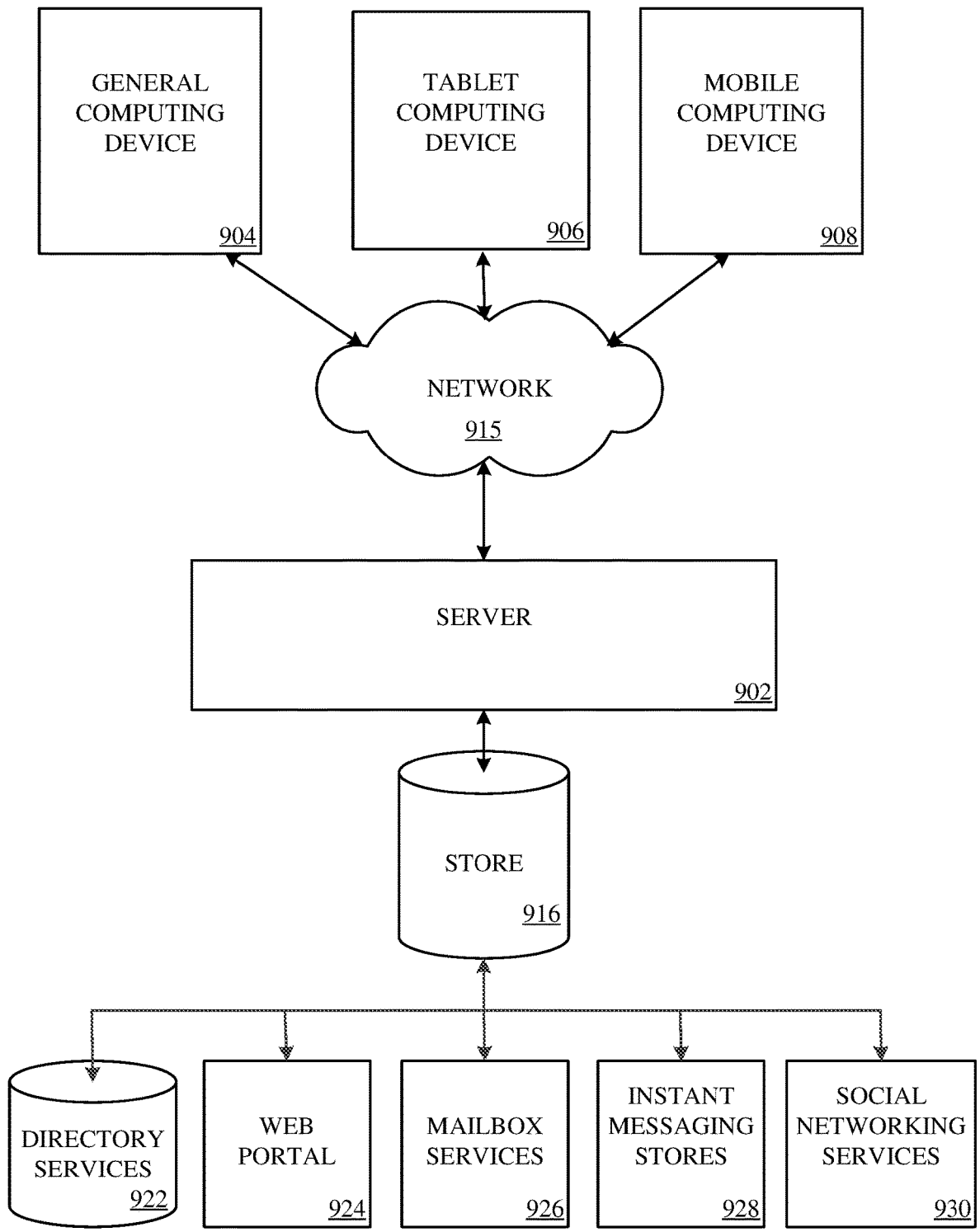
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving navigation and interaction with application files that include values arranged in a grid-type format (e.g., application files that include tables, application files that include charts). For example, all or a portion of application files that include tables and or charts comprising a large amount data and/or a large number of values arranged in a grid-type format, may be viewed in a user-friendly chunk-based user interface on computing devices that have limited display areas and/or computing devices that have input mechanisms/devices that are limited. With typical user interfaces for such application files, navigation of those files and their associated tables and/or charts (which commonly include hundreds, if not thousands of values) is cumbersome for users that access those files on devices with limited display space and/or limited input mechanisms/devices that control navigation of application files. Likewise, the processing expenses associated with users attempting to locate desired information in an application file that is hosted in a cloud-environment can be high. The systems, methods, and devices described herein for presenting, and interacting with, chunk-based user interfaces for application files comprising values arranged in a grid-based format make navigation of those files more efficient, allowing users to quickly identify distinct objects (e.g., individual tables, individual charts, individual images) in an application file, easily navigate to portions/chunks of objects that are relevant to accessing users, and readily access relevant portions of an application file that have been identified by a user via a chunk-based user interface. The processing costs and time associated with performing these functions is therefore improved upon by the systems, methods, and devices described herein in relation to previously available mechanisms for navigating application files that include values arranged in a grid-type format.

As will be understood from the forgoing disclosure one aspect of the technology relates to a method for presenting a chunk-based user interface for an application file, the method comprising: accessing the application file, wherein the application file comprises an object comprising a plurality of values arranged in a grid format; receiving an indication to present the application file in a chunk-based user interface format; presenting, on the display of a computing device, a first chunk comprising a first set of the plurality of values of the object; and presenting, on the display of the computing device, a second chunk comprising a second set of the plurality of values of the object.

According to some examples, the application file is a spreadsheet application file. In other examples, the object comprises one of: a table, and a chart. In additional examples, the plurality of values are comprised in a plurality of rows and a plurality of columns in the grid format. In some examples, the method may further comprise: presenting, on the display of the computing device in association with the first chunk, an indication of a range of columns and rows of the object that are represented in the first chunk; and presenting, on the display of the computing device in association with the second chunk, an indication of a range of columns and rows of the object that are represented in the second chunk. In still other examples, the first and second chunks are user-selectable from the chunk-based user interface for displaying a full version of the application file, with values corresponding to a selected chunk visible in the displayed full version of the application file. In yet other examples, a number of columns and rows comprised in each of the first and second chunks is based on a size of the display of the computing device. In additional examples, the application file comprises a second object comprising a plurality of values arranged in a grid format, and wherein the method further comprises: receiving an indication to view the second object; presenting, on the display of the computing device, a first chunk of the second object comprising a first set of the plurality of values of the second object; and receiving an indication to view a second chunk of the second object; and presenting, on the display of the computing device, a second chunk of the second object comprising a second set of the plurality of values of the second object. According to some aspects, the plurality of values comprise text values sorted alphabetically, and the method further comprises: presenting, on the display of the computing device in association with the first chunk, an indication of a range of alphabetical values of the object that are represented in the first chunk. In additional aspects, the plurality of values comprise numerical values sorted numerically, and the method further comprises: presenting, on the display of the computing device in association with the first chunk, an indication of a range of numerical values of the object that are represented in the first chunk. According to some examples, the indication to present the application file in chunk-based user interface format comprises one of: an indication that the computing device has a display size of less than a certain size; an indication that the computing device is a mobile computing device; and a user selection to switch from a desktop view of the application file to a the chunk-based user interface format. In other examples, the application file comprises a plurality of objects, each of the plurality of objects comprising a plurality of values arranged in a grid format, and the method further comprises: presenting, on the display of the computing device, at least one chunk corresponding to each of the plurality of objects, wherein each displayed chunk has a unique display color associated with it based on an object that it corresponds to.

In another aspect, the technology relates to a system for presenting a chunk-based user interface for an application file, the system comprising: a memory for storing executable program code; and one or more processors, functionally coupled to the memory, the one or more processors being responsive to computer-executable instructions contained in the program code and operative to: access the application file, wherein the application file comprises an object comprising a plurality of values arranged in a grid format; receive an indication to present the application file in a chunk-based user interface format; present, on the display of a computing device, a first chunk comprising a first set of the plurality of values of the object; and present, on the display of the computing device, a second chunk comprising a second set of the plurality of values of the object.

According to some examples, the application file is a spreadsheet application file. In additional examples, the one or more processors are further responsive to the computer-executable instructions contained in the program code and operative to: present, on the display of the computing device in association with the first chunk, an indication of a range of columns and rows of the object that are represented in the first chunk; and present, on the display of the computing device in association with the second chunk, an indication of a range of columns and rows of the object that are represented in the second chunk. According to other examples, the first and second chunks are user-selectable from the chunk based user interface for displaying a full version of the application file, with values corresponding to a selected chunk visible in the displayed full version of the application file.

In another aspect, the technology relates to a computer-readable storage device comprising executable instructions that, when executed by one or more processors, assists with presenting a chunk-based user interface for an application file, the computer-readable storage device including instructions executable by the one or more processors for: accessing the application file, wherein the application file comprises an object comprising a plurality of values arranged in a grid format; receiving an indication to present the application file in a chunk-based user interface format; presenting, on the display of a computing device, a first chunk comprising a first set of the plurality of values of the object; and presenting, on the display of the computing device, a second chunk comprising a second set of the plurality of values of the object. According to some examples, the application file is a spreadsheet application file. In some examples, the instructions are further executable by the one or more processors for: presenting, on the display of the computing device in association with the first chunk, an indication of a range of columns and rows of the object that are represented in the first chunk; and presenting, on the display of the computing device in association with the second chunk, an indication of a range of columns and rows of the object that are represented in the second chunk. In additional examples, the first and second chunks are user-selectable from the chunk-based user interface for displaying a full version of the application file, with values corresponding to a selected chunk visible in the displayed full version of the application file.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer implemented method comprising:
   detecting access to an application file that comprises content of a plurality of object types arranged in a grid format;
   determining that a computing device, used to access the application file, has a display size less than a threshold display size; and
   in response to determining that the computing device has the display size less than the threshold display size, executing a chunking algorithm on the computing device that:
      generates chunk groupings that are each representative of an object type of the plurality of object types,
      generates one or more chunks of content for each of the chunk groupings, wherein each of the one or more chunks comprises a displayable indication of a range of cells in the application file that is represented by a corresponding chunk, and wherein the displayable indication for a chunk of content of the one or more chunks of content includes a first cell letter-number combination from the application file that corresponds to the top left portion of the chunk of content, and a second cell letter-number combination from the application file that corresponds to the lower right portion of the chunk of content, and
      presents, in a graphical user interface, a chunk-based user interface representation for the application file that:
         visually distinguishes the chunk groupings from each other, and
         displays the one or more chunks of content for each of the chunk groupings.

2. The computer implemented method of claim 1, further comprising: rendering the chunk-based user interface representation such that a layout vertically arranges the chunk groupings in the graphical user interface and horizontally arranges the one or more chunks of content for each of the chunk groupings in the graphical user interface.

3. The computer implemented method of claim 2, wherein the chunk groupings are vertically scrollable in the graphical user interface and the one or more chunks of content for each of chunk groupings are horizontally scrollable in the graphical user interface.

4. The computer implemented method of claim 1, wherein generation of the chunk groupings further comprises: analyzing metadata of the application file to identify the plurality of object types and generating the chunk groupings based on identification of the plurality of object types.

5. The computer implemented method of claim 1, wherein the one or more chunks of content for each of the chunk groupings comprises one or more of a plurality of rows and a plurality of columns from the grid format.

6. The computer implemented method of claim 5, wherein a selection of a chunk of the one or more chunks of content causes the chunking algorithm to display, through the graphical user interface, a full version of the application file at locational position of the one or more of a plurality of rows and a plurality of columns.

7. The computer implemented method of claim 5, wherein generation of the one or more chunks of content for each of the chunk groupings further comprises identifying, from the grid format, columns and rows associated with the object type within the application file, determining a number of chunks of content to display for each of the chunk groupings based on an identification of the columns and rows associated with the object type.

8. A system comprising:
   at least one processor; and
   a memory, operatively connected with the at least one processor, storing computer-executable instructions that, when executed by the at least one processor, causes the at least one processor to execute a method that comprises:
      detecting access to an application file that comprises content of a plurality of object types arranged in a grid format,
      determining that a computing device, used to access the application file, has a display size less than a threshold display size, and
      in response to determining that the computing device has the display size less than the threshold display size, executing a chunking algorithm on the computing device that:
         generates chunk groupings that are each representative of an object type of the plurality of object types, generates one or more chunks of content for each of the chunk groupings wherein each of the one or more chunks comprises a displayable indication of a range of cells in the application file that is represented by a corresponding chunk, and wherein the displayable indication for a chunk of content of the one or more chunks of content includes a first cell letter-number combination from the application file that corresponds to the top left portion of the chunk of content, and a second cell letter-number combination from the application file that corresponds to the lower right portion of the chunk of content, and presents, in a graphical user interface, a chunk-based user interface representation for the application file that:

visually distinguishes the chunk groupings from each other, and displays the one or more chunks of content for each of the chunk groupings.

9. The system of claim 8, wherein the method, executed by the at least one processor further comprises: rendering the chunk-based user interface representation such that a layout vertically arranges the chunk groupings in the graphical user interface and horizontally arranges the one or more chunks of content for each of the chunk groupings in the graphical user interface.

10. The system of claim 9, wherein the chunk groupings are vertically scrollable in the graphical user interface and the one or more chunks of content for each of chunk groupings are horizontally scrollable in the graphical user interface.

11. The system of claim 8, wherein generation of the chunk groupings further comprises: analyzing metadata of the application file to identify the plurality of object types and generating the chunk groupings based on identification of the plurality of object types.

12. The system of claim 8, wherein the one or more chunks of content for each of the chunk groupings comprises one or more of a plurality of rows and a plurality of columns from the grid format.

13. The system of claim 12, wherein a selection of a chunk of the one or more chunks of content causes the chunking algorithm to display, through the graphical user interface, a full version of the application file at locational position of the one or more of a plurality of rows and a plurality of columns.

14. The system of claim 12, wherein generation of the one or more chunks of content for each of the chunk groupings further comprises identifying, from the grid format, columns and rows associated with the object type within the application file, determining a number of chunks of content to display for each of the chunk groupings based on an identification of the columns and rows associated with the object type.

15. A method comprising:

detecting access to an application file by a client computing device, wherein the application file comprises content of a plurality of object types arranged in a grid format;

determining that the client computing device has a display size less than a threshold display size; and in response to determining that the client computing device has the display size less than the threshold display size, executing a chunking algorithm that:

generates chunk groupings that are each representative of an object type of the plurality of object types, generates one or more chunks of content for each of the chunk groupings wherein each of the one or more chunks comprises a displayable indication of a range of cells in the application file that is represented by a corresponding chunk, and wherein the displayable indication for a chunk of content of the one or more chunks of content includes a first cell letter-number combination from the application file that corresponds to the top left portion of the chunk of content, and a second cell letter-number combination from the application file that corresponds to the lower right portion of the chunk of content, renders a chunk-based user interface representation for the application file that:

visually distinguishes the chunk groupings from each other, and displays the one or more chunks of content for each of the chunk groupings, and transmits a rendering of the chunk-based user interface representation to the client computing device for display.

16. The method of claim 15, wherein rendering renders the chunk groupings to be vertically scrollable in the chunk-based user interface representation and the one or more chunks of content for each of chunk groupings are horizontally scrollable in the chunk-based user interface representation.

17. The method of claim 8, wherein the one or more chunks of content for each of the chunk groupings comprises one or more of a plurality of rows and a plurality of columns from the grid format.

18. The method of claim 17, wherein generation of the one or more chunks of content for each of the chunk groupings further comprises identifying, from the grid format, columns and rows associated with the object type within the application file, determining a number of chunks of content to display for each of the chunk groupings based on an identification of the columns and rows associated with the object type.

* * * * *